United States Patent
Zou

(10) Patent No.: US 10,737,596 B2
(45) Date of Patent: Aug. 11, 2020

(54) ALL-TERRAIN VEHICLE AND ITS SEAT

(71) Applicant: Zhejiang CFMOTO Power Co., Ltd., Hangzhou, Zhejiang (CN)

(72) Inventor: Pengfei Zou, Hangzhou (CN)

(73) Assignee: Zhejiang CFMOTO Power Co., Ltd., Hangzhou (CN)

(*) Notice: Subject to any disclaimer, the term of this patent is extended or adjusted under 35 U.S.C. 154(b) by 0 days.

(21) Appl. No.: 16/109,608

(22) Filed: Aug. 22, 2018

(65) Prior Publication Data
US 2019/0061572 A1 Feb. 28, 2019

(30) Foreign Application Priority Data

Aug. 28, 2017 (CN) .......................... 2017 1 0752289

(51) Int. Cl.
*B60N 2/06* (2006.01)
*B60N 2/07* (2006.01)
(Continued)

(52) U.S. Cl.
CPC ................. *B60N 2/38* (2013.01); *B60N 2/06* (2013.01); *B60N 2/0732* (2013.01); *B60N 2/646* (2013.01); *B60N 2/686* (2013.01); *B60N 2/075* (2013.01)

(58) Field of Classification Search
CPC . B60N 2/06; B60N 2/07; B60N 2/015; B60N 2/38; B60N 2/39; B60N 2/646;
(Continued)

(56) References Cited

U.S. PATENT DOCUMENTS 3,663,057 A * 5/1972 Lohr ...................... B60N 2/686
297/452.14
3,713,696 A * 1/1973 Dudley .................... B60N 2/64
297/452.55
(Continued)

FOREIGN PATENT DOCUMENTS

DE 102008012376 A1 * 9/2009 ............. B60N 2/062
FR 3062825 A1 * 8/2018 ........... B60N 2/1846

OTHER PUBLICATIONS

Machine Translation of DE102008012376, http://translationportal.epo.org/emtp/translate/?ACTION=description-retrieval&COUNTRY=DE&ENGINE=google&FORMAT=docdb&KIND=A1&LOCALE=en_EP&NUMBER=102008012376&OPS=ops.epo.org/3.2&SRCLANG=de&TRGLANG=en; Aug. 16, 2019 (Year: 2019).*

*Primary Examiner* — Ryan D Kwiecinski
(74) *Attorney, Agent, or Firm* — Jeffrey D. Shewchuk; Shewchuk IP Services, LLC

(57) ABSTRACT

The invention discloses a type of seat, including the seat baseplate, the soft cushion and the underframe assembly; wherein, the said soft cushion is arranged on the said seat baseplate; the said seat baseplate is connected to the framework through the said underframe assembly; the said seat baseplate adopts integrated injection molding. The seat baseplate in the present invention adopts integrated injection molding. The soft cushion is arranged on the seat baseplate to form the complete seat. Compared with the machining method in the prior art that the backrest and the base are separately machined and then the backrest and the base are assembled with each other; the machining procedure of the seat baseplate in the present invention is simple, thus the production efficiency is improved and the production cost is reduced. The invention also discloses a type of all-terrain vehicle provided with the above seat.

9 Claims, 3 Drawing Sheets

(51) Int. Cl.
*B60N 2/38* (2006.01)
*B60N 2/64* (2006.01)
*B60N 2/68* (2006.01)
*B60N 2/075* (2006.01)

(58) Field of Classification Search
CPC .. B60N 2/686; B60N 2/7017; B60N 2205/35; B60N 2/0732; B60N 2/075
See application file for complete search history.

(56) References Cited

U.S. PATENT DOCUMENTS

| | | | | |
|---|---|---|---|---|
| 3,740,014 A | * | 6/1973 | Swenson | B60N 2/06 248/608 |
| 3,758,159 A | * | 9/1973 | Morris | B60N 2/38 297/452.14 |
| 2008/0231090 A1 | * | 9/2008 | Takeda | B60N 3/063 297/83 |

* cited by examiner

ALL-TERRAIN VEHICLE AND ITS SEAT

CROSS-REFERENCE TO RELATED U.S. APPLICATION(S)

None.

FIELD OF THE INVENTION

The present invention relates to the technical field of all-terrain vehicle, and more particularly, to a type of all-terrain vehicle and its seat.

BACKGROUND OF THE INVENTION

When used in an all-terrain vehicle, a common type of seat usually includes a seat baseplate and a soft cushion. The soft cushion is arranged on the seat baseplate. The seat baseplate includes a backrest and base. In the process of machining, the backrest and base are machined separately, and then the backrest and base are assembled into one body. The machining procedure of this production mode is tedious and inefficient.

Therefore, how to simplify the machining process described above, to improve production efficiency and reduce production cost, is a technical defect which urgently needs to be solved for those skilled in the art.

BRIEF SUMMARY OF THE INVENTION

The purpose of the invention is to provide a type of seat, which has the advantages of a simple machining procedure, high production efficiency and low production cost.

In order to achieve the above object, the invention provides the following technical schemes:

The seat includes the seat baseplate, the soft cushion and the underframe assembly; wherein, the soft cushion is arranged on the seat baseplate; the seat baseplate is connected to the framework of the vehicle through the underframe assembly; and the seat baseplate is formed as an integrated unit by injection molding.

Preferably, the seat baseplate is provided with an air hole.

Preferably, the soft cushion is connected to the seat baseplate by a screw.

Preferably, the soft cushion includes a backrest cushion and seat cushion as separate parts; and the backrest cushion includes a right backrest cushion, a left backrest cushion and a middle backrest cushion all as separate parts.

Preferably, the three parts of the backrest cushion and the seat cushion are made by a polyurethane ("PU") self-skinning process.

Preferably, the underframe assembly includes:

a slide rail which is inclined such that one end of the slide rail is higher than the other end; and the slide rail is connected to the framework of the vehicle; and a slider which is suitable for the slide rail arranged on the slide rail with the slider being located under the seat baseplate and connected to the seat baseplate.

Preferably, the underframe assembly also includes a bolt and lock nut and uses a gasket. The bolt is arranged on the slider, the gasket is located on the seat baseplate, and the bolt passes through the seat baseplate and the gasket with the gasket and the seat baseplate then being locked on the slider by the lock nut.

Preferably, the underframe assembly also includes:

a clip tube connected to one end of the slide rail. The extension direction of the clip tube is perpendicular to the extension direction of the slide rail.

A clip slot member is connected to the framework. The clip slot member is provided with the clip slot suitable for the clip tube, and the clip tube is arranged into the clip slot.

Preferably, the underframe assembly also includes:

A clip hook connected to the other end of the slide rail.

A clip member suitable for the clip hook is connected to the framework of the vehicle, and the clip hook is hooked on the clip member.

Preferably, the underframe assembly includes two slide rails with a parallel arrangement.

The invention also involves an all-terrain vehicle including such a seat as described in any of the above.

To create the preferred seat, the seat baseplate is first formed as an integrated unit by injection molding. The soft cushion parts are arranged on the seat baseplate and attached to the seat baseplate to form the complete seat. Compared with the machining method in the prior art wherein the backrest and the base are separately machined and then the backrest and the base are assembled with each other; the machining procedure of the seat baseplate in the present invention is simple, thus the production efficiency is improved and the production cost is reduced.

BRIEF DESCRIPTION OF THE DRAWINGS

In order to describe the technical scheme more clearly in the existing technology or the embodiment of the present invention, the drawings required for the implementation of the existing technology or the embodiment of the present invention are briefly introduced as follows. The drawings below represent some embodiments of the present invention. For technical personnel of ordinary skill in the art, other embodiments can achieve the premise without requiring creative labor.

Figure 1:
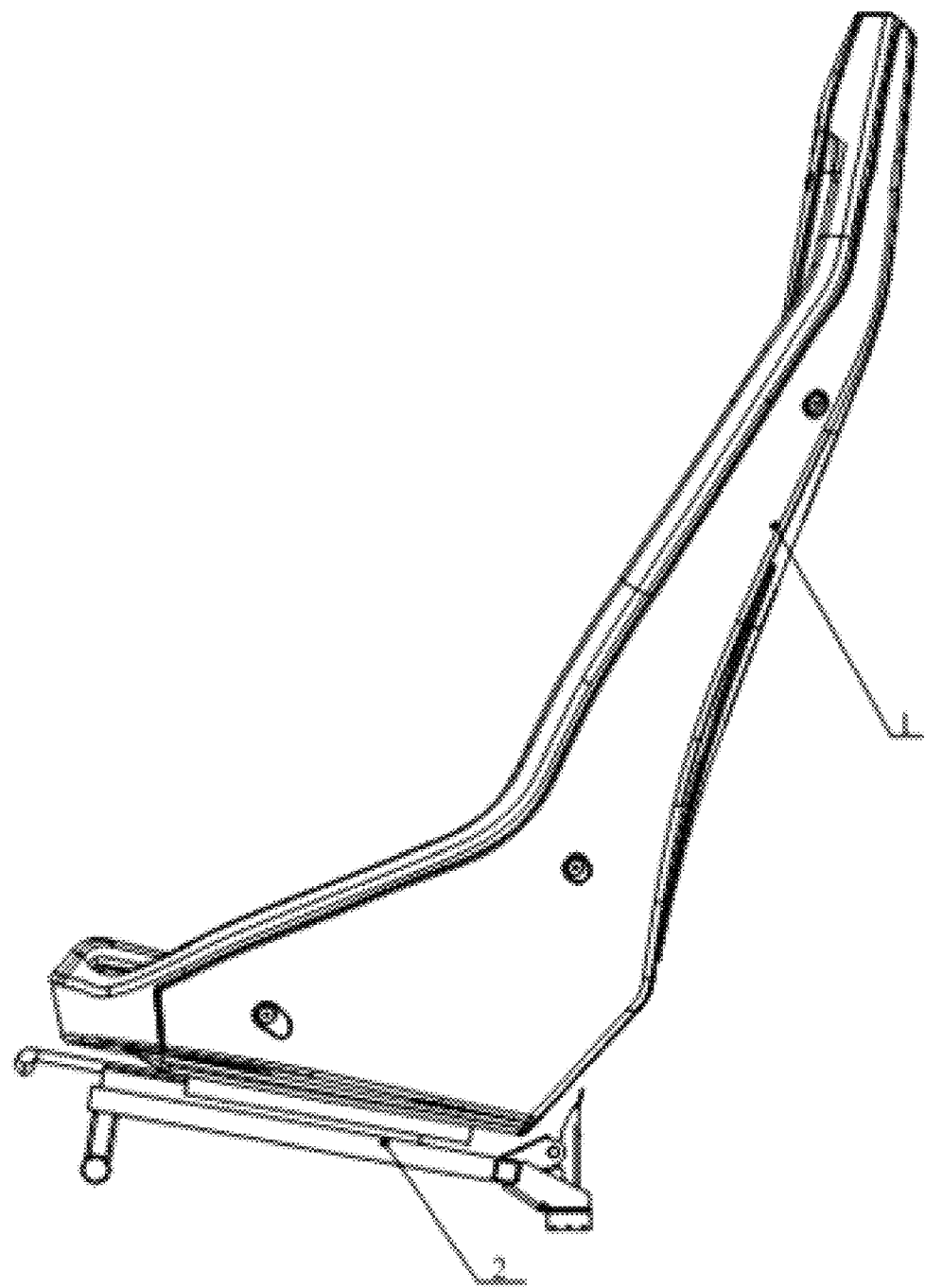
FIG. 1 is a side view showing the structure of the seat baseplate provided by the embodiment of the present invention.

Within these drawings, reference numerals are as follows: seat baseplate 1, underframe assembly 2, gasket 21, slider 22, slide trail 23, bolt 24, clip tube 25, clip hook 26, clip slot 27, right backrest cushion 31, middle backrest cushion 32, left backrest cushion 33, seat cushion 34, and framework 4.

DETAILED DESCRIPTION OF THE PREFERRED EMBODIMENTS

The invention involves a type of seat, which has the advantages of simple machining procedure, high production efficiency and low production cost.

The technical scheme of the preferred embodiment of the present invention is clearly and completely described in the following combined with the accompanying drawings. This embodiment is just one of the many possible embodiments. Based on the preferred embodiment of the present invention, other embodiments will be understood by the ordinary technical personnel in the art, which can obtain the premise of the present invention without requiring creative labor.

Figure 2:
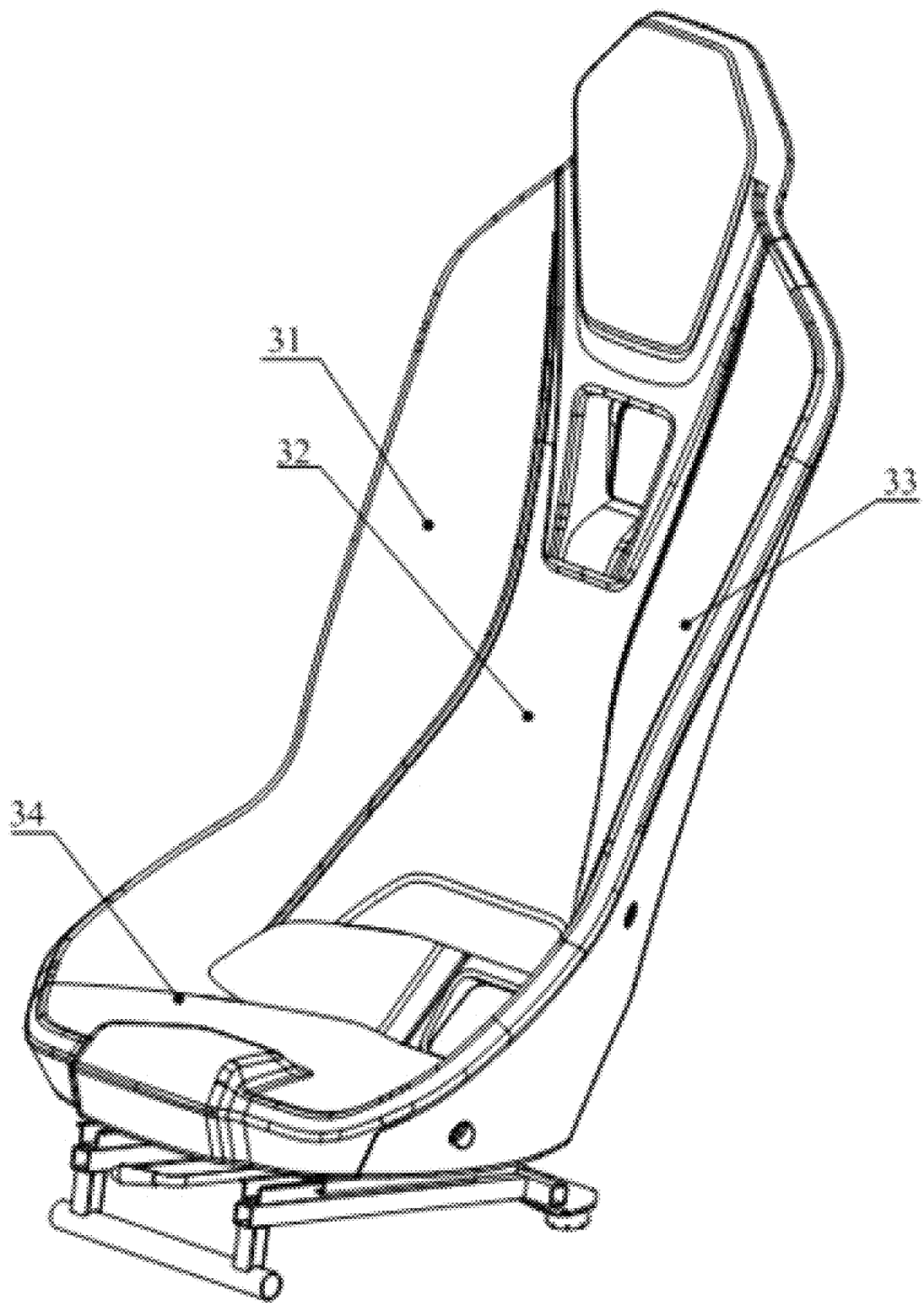
FIG. 2 is a schematic view showing the overall structure of the seat provided by the embodiment of the present invention.
Figure 3:
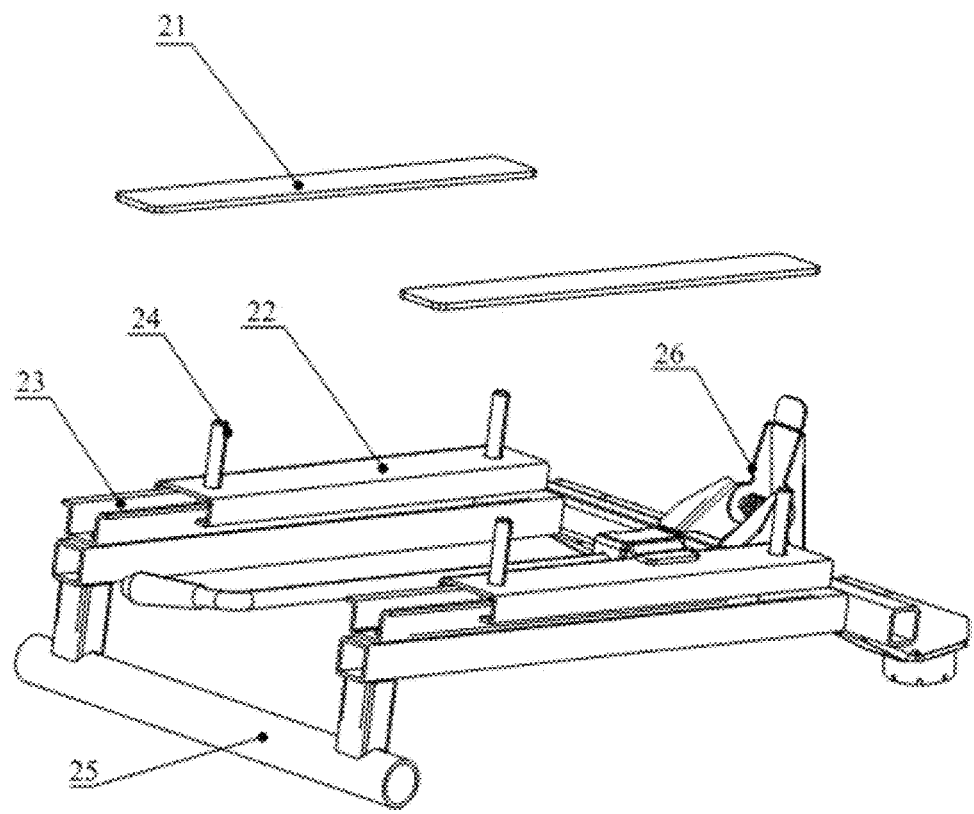
FIG. 3 is an exploded view showing the structure of the underframe assembly provided by the embodiment of the present invention.
Figure 4:
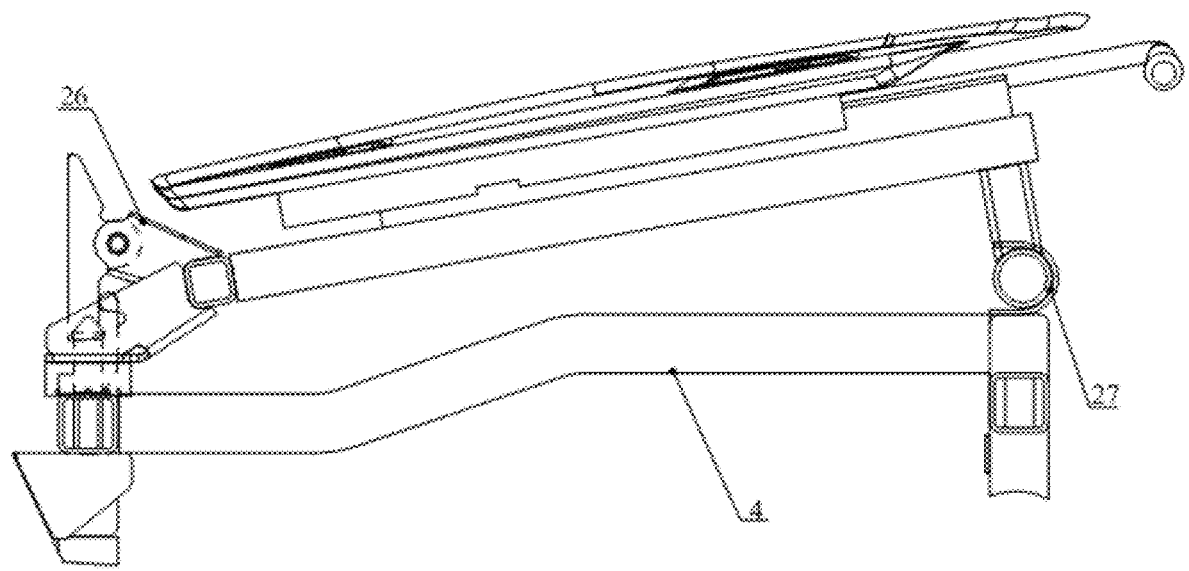
FIG. 4 is a side view showing the structure of the underframe assembly provided by the embodiment of the present invention.

Referring to FIGS. 1-4, in the depicted embodiment of the present invention, the seat includes a seat baseplate 1, a soft cushion, and an underframe assembly 2. The seat baseplate 1 provides the skeleton of the seat. The soft cushion is arranged on the seat baseplate 1. The seat baseplate 1 is connected to the frame 4 through the underframe assembly 2. The seat baseplate 1 in this embodiment is formed as an integrated unit by injection molding, The soft cushion is arranged on the seat baseplate 1 to form the complete seat. Compared with the machining method in the prior art wherein the backrest and the base are separately machined and then the backrest and the base are assembled with each other, the manufacturing procedure of the seat baseplate in the present invention is simple, and thus the production efficiency is improved and the production cost is reduced.

In order to ensure the breathability of the seat, an air hole can be arranged on the seat baseplate 1. The arrangement of the air hole also reduces the weight of the whole seat and therefore plays a role of reducing the load.

In the depicted embodiment of the invention, the soft cushion mentioned above is connected to the seat baseplate 1 by a screw connection. The screw connection ensures the fastness of connection between the soft cushion and the seat baseplate 1.

Further, in order to facilitate the installation of the soft cushion, the soft cushion is divided into a backrest cushion and a seat cushion 34 with the seat cushion 34 being a separate part. The backrest cushion is divided into a right backrest cushion 31, a middle backrest cushion 32 and a left backrest cushion 33 as separate parts. During installation, the four parts of the right backrest cushion 31, the middle backrest cushion 32, the left backrest cushion 33 and the seat cushion 34 are each connected at their corresponding positions on the seat baseplate 1 by screw connections respectively, such that the four parts collectively provide the complete cushion.

In the preferred embodiment of the invention, the backrest cushion (three parts) and seat cushion 34 are each made by a polyurethane ("PU") self-skinning process, which uses the reaction of polyurethane two-component material to form the epidermis and core at one time. Compared with the traditional leather coating process, making the seat cushion 34 and backrest cushion by a PU self-skinning process provides strong wear resistance, crack resistance and elasticity. In addition, the manufacturing procedure of the PU self-skinning process is simpler than that of the traditional leather coating process and the manufacturing efficiency is high, and thus production efficiency is further improved.

In the depicted embodiment of the invention, the underframe assembly 2 includes a slide rail 23 and a slider 22. The slide rail 23 is connected to the frame 4. The slide rail 23 is tilted and one end of the slide rail 23 is higher than the other end. For example, the front end of the slide rail 23 is higher than the rear end. The slider 22 is arranged on the slide rail 23 and is fitted to the slide rail 23, and the slider 22 can be slid in the extension direction of the slide rail 23 on the slide rail 23. The seat baseplate 1 is arranged on the slider 22 and is connected to the slider 22, and the seat baseplate 1 can be slid in the extension direction of the slide rail 23 through sliding movement of the slider 22 on the slide rail 23. If the front end of the slide rail 23 is higher than the rear end, the seat will rise when the seat baseplate 1 is slid forward; the seat will be lowered when the seat baseplate 1 is slid backward. The underframe assembly 2 in the depicted embodiment allows the seat height to be adjusted to meet the different needs of the driver.

In the preferred embodiment of the invention, the underframe assembly 2 also includes bolts 24, each with a lock nut (not shown), and two gaskets 21. The bolts 24 are connected to the sliders 22. The gaskets 21 are located on the seat baseplate 1. During installation, the bolts 24 are passed through the seat baseplate 1 and the gaskets 21 in turn and then a lock nut is rotated and fixedly locked from the top of each bolt 24, such that the gaskets 21 and the seat baseplate 1 are fixedly locked onto the slider 22 by the lock nuts. The connection type between the seat baseplate 1 and the slider 22 provided by the preferred embodiment is removable yet firm.

In the depicted embodiment of the invention, the underframe assembly 2 also includes a clip tube 25 and a clip slot member 27. The clip tube 25 is connected to one end of the slide rail 23. The extension direction of the clip tube 25 is perpendicular to the extension direction of the slide rail 23. The clip slot member 27 is connected to the frame 4, and the clip slot member 27 is provided with the clip slot which adapts to the clip tube 25. The clip tube 25 is arranged into the clip slot, so one end of the slide rail 23 is connected to the frame 4.

Further, the preferred underframe assembly 2 also includes a clip hook 26 and corresponding clip member. The clip hook 26 is connected to the other end of the slide rail 23. The clip member is connected to the frame 4. The clip hook 26 can be hooked on the clip member to be connected to the frame 4. Thus, one end of the slide rail 23 is connected to the clip slot member 27 through the clip tube 25 and the other end of the slide rail 23 is hooked to the clip member through the clip hook 26 to realize the connection between the underframe assembly 2 and the frame 4. The connection type is easily operated and the connection is firm. The other end of the slide rail 23 is connected to a connector whose extension direction is parallel to the extension direction of the clip tube 25, and the clip hook 26 is arranged on the connector.

The slide rail 23 is tilted. One end of the slide rail 23 is connected to a support foot which is connected to the clip tube 25. One end of the slide rail 23 is supported by the support foot to cause the slide rail 23 to be inclined.

The structure of the slide rail 23 can adopt a groove structure. To achieve the groove structure, the upper ends of two lateral plates of the groove structure are bent outward to form an outer bending part. Also, the lower ends of the two lateral plates of the slider 22 are bent inward to form an inner bending part. The inner bending part of the slider 22 is mounted below the outer bending part of the slide rail 23, and the slider 22 can only be slid in the extension direction of the slide rail 23 in relation to the slide rail 23.

In the preferred embodiment of the invention, two slide rails 23 are provided in order to ensure the stability and fastness of the connection between the seat baseplate 1 and the underframe assembly 2, and to ensure that the seat baseplate 1 can be slid smoothly along the slide rail 23. The two slide rails are distributed left and right in parallel arrangement. Each slide rail 23 is provided with a slider 22.

The invention also provides a type of all-terrain vehicle including the seat as described in any of the above. The above seat has the above advantages, and the all-terrain vehicle provided with the above seat also has the above advantages.

The above descriptions of the disclosed embodiment enable professional and technical personnel in the art to achieve or use the present invention. Professional and technical personnel in the art may make many modifications to this embodiment without departing from the spirit or essential attributes of the present invention. Therefore, this invention will not be limited to the embodiment shown herein, but to conform to the maximum extent of principles and new features that are disclosed herein.

The invention claimed is:

1. A seat for use in an all terrain vehicle, the seat comprising:
   a seat baseplate formed as an integrated unit by injection molding;
   a soft cushion provided as a plurality of separate cushion parts, each cushion part arranged on and connected to the seat baseplate; and
   an underframe assembly, wherein the seat baseplate is connectable to a framework of the all terrain vehicle through the underframe assembly, wherein the underframe assembly comprises:
      a slide rail which is inclined such that one end of the slide rail is higher than another end, with the slide rail being connectable to the framework of the all terrain vehicle;
      a slider suitable for the slide rail arranged on the slide rail, with the slider being located under the seat baseplate and connected to the seat baseplate;
      a clip tube connected to one end of the slide rail such that an extension direction of the clip tube is perpendicular to an extension direction of the slide rail; and
      a clip slot member connected to the framework of the all terrain vehicle, wherein the clip slot member is provided with a clip slot suitable for the clip tube with the clip tube securing the underframe assembly to the framework of the all terrain vehicle by arranging the clip tube into the clip slot.

2. The seat according to claim 1 in which each cushion part of the soft cushion is connected to the seat baseplate by one or more screws.

3. The seat according to claim 1 in which the soft cushion includes a backrest cushion and a seat cushion, and in which the backrest cushion comprises:
   a right backrest cushion part;
   a left backrest cushion part; and
   a middle backrest cushion part.

4. The seat according to claim 3, wherein the seat cushion and each part of the backrest cushion are made by a polyurethane ("PU") self-skinning process.

5. The seat according to claim 1 wherein the underframe assembly further comprises at least one bolt and at least one gasket, the bolt being arranged on the slider and the gasket being located on the seat baseplate with the bolt passing through the seat baseplate and the gasket.

6. The seat according to claim 1, wherein the underframe assembly further comprises:
   a clip hook connected to another end of the slide rail; and
   a clip member which is suitable for the clip hook connected to the framework of the all terrain vehicle, with the clip hook securing the underframe assembly to the framework of the all terrain vehicle by hooking the clip hook on the clip member.

7. The seat according to claim 1 comprising two slide rails with a parallel arrangement.

8. A seat for use in an all terrain vehicle, the seat comprising:
   a seat baseplate formed as an integrated unit by injection molding;
   a soft cushion arranged on and connected to the seat baseplate; and
   an underframe assembly, wherein the seat baseplate is connectable to a framework of the all terrain vehicle through the underframe, wherein the underframe assembly comprises:
   a slider located under the seat baseplate and connected to the seat baseplate;
   a slide rail suitable for the slider and arranged under the slider, the slide rail having a slide rail extension direction;
   a clip tube connected to a forward end of the slide rail with a clip tube extension direction being perpendicular to the slide rail extension direction;
   a clip slot member connectable to the framework of the all terrain vehicle, the clip slot member providing a clip slot suitable for the clip tube, such that when the clip tube is in the clip slot the clip slot member prevents raising or lowering of the clip tube;
   a clip hook connected to a rearward end of the slide rail; and
   a clip member connectable to the framework of the all terrain vehicle, the clip member being suitable for the clip hook, such that when the clip hook is hooked to the clip member, the clip member prevents raising or lowering of the clip hook;
   wherein the clip tube arranged within the clip slot and the clip hook hooked to the clip member collectively secure the underframe assembly to the framework of the all terrain vehicle.

9. The seat of claim 8, wherein the slide rail is inclined such that the forward end of the slide rail is higher than the rearward end of the slide rail.

* * * * *